May 31, 1960  L. P. GREENE ET AL  2,938,680
MULTIPLE POSITION AIRFOIL SLAT
Filed July 2, 1957  7 Sheets-Sheet 1

INVENTORS
LAWRENCE P. GREENE
BURTON C. RICKEY
CARLTON H. WOLF
BY
Charles F. Dieckler
ATTORNEY May 31, 1960 L. P. GREENE ET AL 2,938,680
MULTIPLE POSITION AIRFOIL SLAT
Filed July 2, 1957 7 Sheets-Sheet 4

INVENTORS
LAWRENCE P. GREENE
BURTON C. RICKEY
CARLTON H. WOLF
BY
Charles F. Dischler
ATTORNEY

United States Patent Office 2,938,680
Patented May 31, 1960

2,938,680

MULTIPLE POSITION AIRFOIL SLAT

Lawrence P. Greene, Rolling Hills, Burton C. Rickey, Palos Verdes Estates, and Carlton H. Wolf, Pacific Palisades, Calif., assignors to North American Aviation, Inc.

Filed July 2, 1957, Ser. No. 669,484

13 Claims. (Cl. 244—42)

This invention relates to airfoils and more particularly it is concerned with an improved type of automatically actuated slat for achieving the optimum wing leading edge configuration for widely separated flight environmental conditions.

The physical wing characteristics that are desirable and necessary for high speed flight are in contrast to those required for landing at low speeds or takeoff with relatively short ground runs under heavy loads. A wing having a high degree of camber and maximum lift characteristics affords the optimum configuration for takeoff and landing. Such a wing is incapable of use in the high speed ranges where drag and loading become of paramount importance. This problem becomes even more acute with the super thin symmetrical wings that are in prospect of use on future high speed aircraft operating in the higher supersonic ranges. These thin wings are generally symmetrical about the wing chord line which results in greatly reduced lifting capabilities for low speed flight.

Many ways of varying the camber of a wing have been evolved in the prior art in an attempt to impart both desirable high speed and low speed characteristics to a wing. In general, these designs have involved the use of an adjustable auxiliary airfoil in conjunction with the main wing. Such an airfoil may be either a leading edge slat or a flap at the trailing edge of the wing. In addition, wings having deformable edge surfaces of the droop-nose type have come into relatively widespread use.

Most of the prior art devices for achieving such variable wing characteristics generally achieve only a compromise between conflicting goals. This is illustrated by the presently used type of one-position, automatically operated slat.

Slats, in general, are either of the automatic or mechanically operated type. The designation of a slat as automatic means that the slat is moved away from or toward the wing proper solely by the aerodynamic forces acting thereon. These aerodynamic forces, in turn, are a function of the wing configuration, the slat configuration and hinge axis location, and the air speed and angle of attack of the aircraft. No mechanical or hydraulic mechanism is required for this operation. The slat is free to move from a retracted or closed position, wherein it abuts the main wing portion and forms a symmetrical continuation thereof, to an extended position forward from the wing and generally angularly related thereto whereby a slot is formed between the slat and the wing with a consequent increase in the lift of the wing.

Some types of military aircraft must possess good maneuverability in addition to high speed potential. This imposes the requirement of a compromise design wherein the airfoil will possess characteristics between those of the extreme low-lift high-speed characteristics and the high-lift low-speed requirements for landing and takeoff. Presently known automatically operated slats can be designed either for the low speeds of landing and takeoff, or for high speed maneuverability or else they are a compromise between the requirements of low speed and maneuvering speed. Additionally, military aircraft present complex structural problems in the installation of slat mechanism due to the thinness of such wings and the fact that a military wing is largely employed for housing devices or for storage of fuel. This leaves but little room for slat-supporting devices and greatly limits the amount of travel of a slat track mechanism therein.

The necessity for compromising between desirable airfoil configurations at different flight conditions as well as the space limitations inherent in a military wing are obviated by the present invention wherein one or more wing slats may be moved under the applied forces of the aerodynamic load about a multiplicity of different axes of slat rotation into predetermined positions to achieve optimum lift and drag characteristics for the wing for a series of different operating speed ranges and attitudes. Each slat position is predetermined to correspond to a particular location or range of locations of the vector of the aerodynamic forces acting on each slat. Proper positioning of the slat device is achieved by telescoping members which allow the slat to rotate about a series of different axes which are chosen such that each slat device will be aerodynamically actuated to the optimum position for a particular range of speeds and angles of attack of the aircraft.

Accordingly, it is the general object of this invention to provide a normally high speed airfoil configuration that automatically adjusts to an intermediate positive camber position for relatively high lift with nominal drag for maneuvering or high cruise speed ranges, and which further adjusts to an extreme cambered position for relatively higher lift for landing and takeoff.

It is also an object of this invention to provide a slat device that is susceptible of guided movement in incremental steps which correspond to definite positions of the aerodynamic force resultant on each slat.

It is also an object of this invention to provide a wing slat mechanism that is linearly or curvilinearly extendible forwardly from a wing in successive steps about different axes of rotation.

It is another object of this invention to provide a wing that may be extended in chord dimension with smooth transition from one ideal airfoil configuration to another.

It is still another object of this invention to provide a wing automatically variable in chord, and to a certain extent in camber, to at least two positions at each cross section and in which one or more airjet passages open automatically at relatively high camber.

It is a further object of this invention to provide an automatic multiple slat mechanism wherein a first slat is extended about one axis of rotation to provide a relatively high lift and wherein the first slat and one or more additional slats may be extended to a second position about a second axis of rotation to provide even greater lift.

It is a still further object of this invention to provide a telescopic type slat guide means having separate portions rotatable about different axes of rotation which requires a minimum of chordwise housing space within the wing and is of lightweight construction.

These and other objects and advantages of the present invention will become apparent to those skilled in the art after reading the present specification and the accompanying drawings forming a part thereof, in which.

Figure 1:
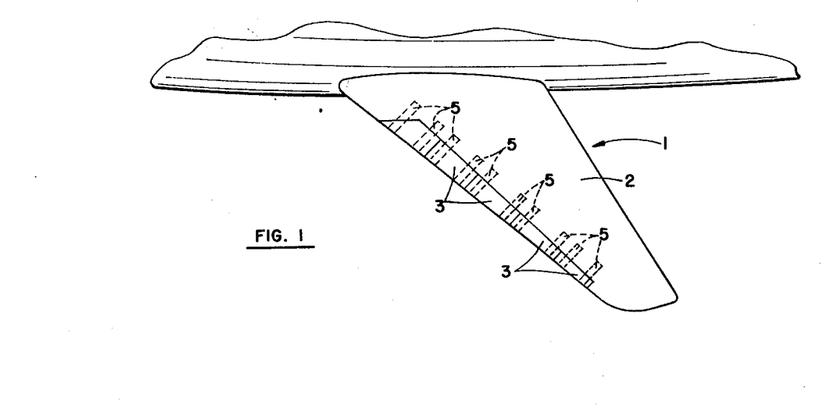
Fig. 1 is a perspective view of a portion of an aircraft having a swept-wing with a series of adjoining slat sections forming a major portion of the wing leading edge.
Figure 2:
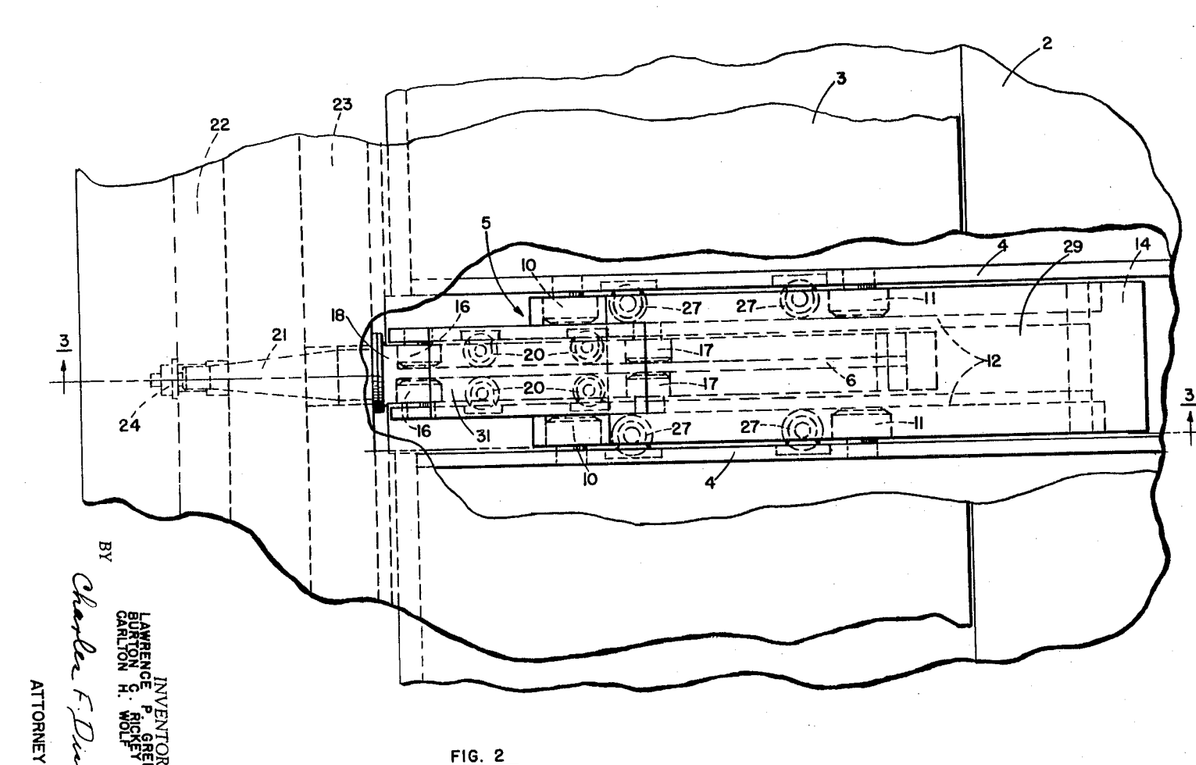
Fig. 2 is a partially broken away view of a fragmentary portion of a wing and slat showing the track mechanism in plan view.

Referring specifically to the drawings wherein like reference characters have been used throughout the several views to designate like parts, and referring at first to the embodiment of Fig. 1, reference numeral 1 generally designates an aircraft wing comprising a main wing panel 2 with a series of slats 3 forming the major portion of the leading edge of the wing. In its retracted or closed position slat 3 is in juxtaposition to main wing portion 2 and forms a continuation thereof, as more clearly shown in cross section in view of Fig. 3. Wing portion 2 and slat 3 thus combine to form an airfoil having the desired characteristics for high speed flight. As shown in this application, applicants' invention is applied to a thin high speed wing that is symmetrical about its chord line, i.e., a wing having no positive camber. This invention is not restricted, however, to such wings, but it is equally applicable to any wing requiring a slat.

Furthermore, while the axes of slat rotation will henceforth be generally designated as the "high speed" and "low speed" axes, these terms are merely relative and are not meant to denote definite speed ranges or conditions of operation. For example, the dual position slat of this invention could be designed for optimum performance for any pair of the following different flight modes: high speed maneuverability, optimum cruise condition, loiter or hovering flight, and landing or takeoff.

Figures 5, 6, 7:
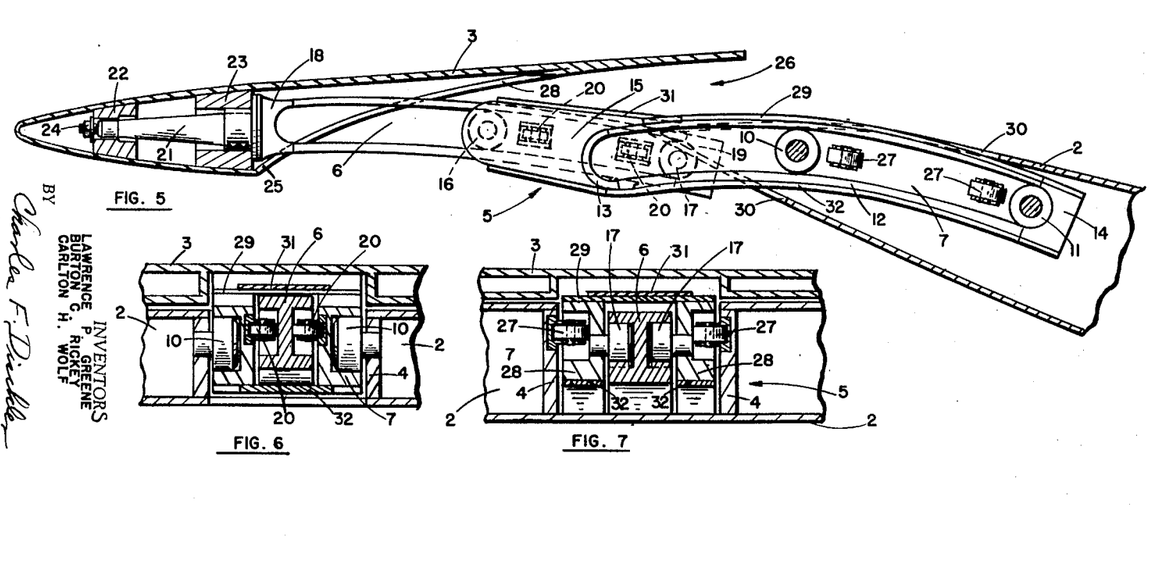
Fig. 5 is a sectional view similar to Figs. 3 and 4 but showing the secondary track member extended outwardly and downwardly to place the slat in its fully extended position and form a slot of maximum width, thereby placing the wing in its maximum lift configuration.
Fig. 6 is a transverse sectional view of the track mechanism taken in the plane of line 6—6 of Fig. 3 showing some of the fore-and-aft rollers for the secondary track member and side rollers for the interior primary track member.
Fig. 7 is a transverse sectional view of the track mechanism taken in the plane of line 7—7 of Fig. 3 showing some of the fore-and-aft rollers for the primary track member and side rollers for the secondary track member.
Figure 8:
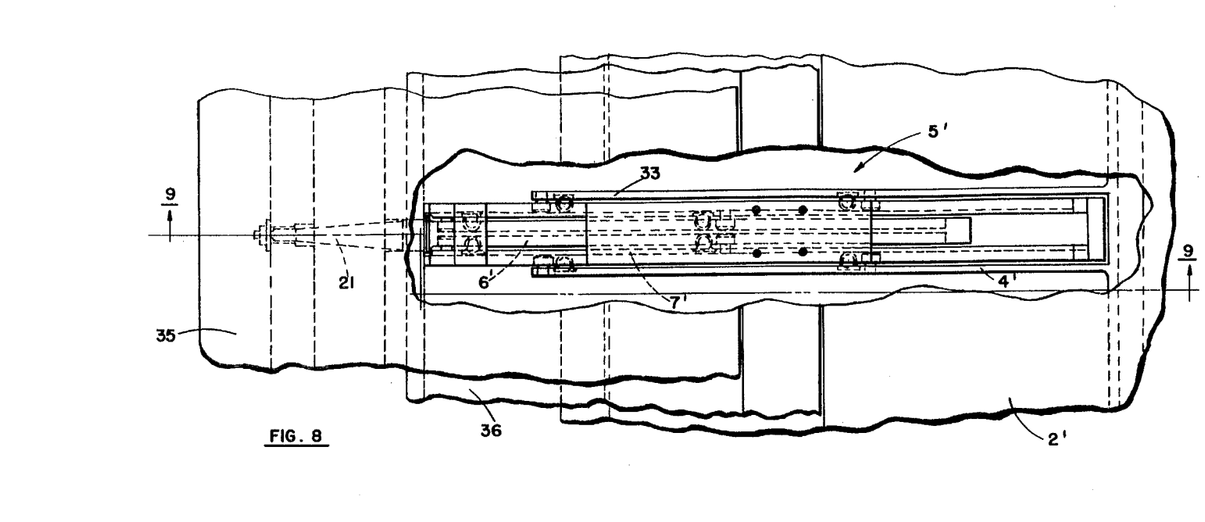
Fig. 8 is a partially broken away view of a second embodiment of the invention utilizing dual slats and showing a fragmentary portion of the wing, double slat and track mechanism in plan view.
Figure 9:
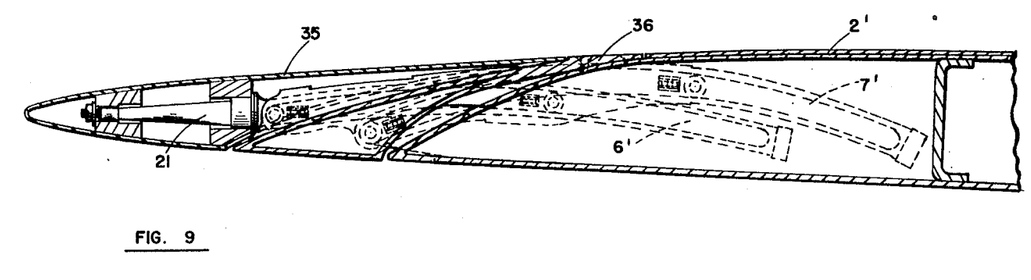
Fig. 9 is a sectional view of this second embodiment taken in the plane of line 9—9 in Fig. 8 and showing the slat track mechanism in an elevational view with the track and attached slat segments fully retracted to form a smooth, continuous high speed airfoil profile.
Figure 10:
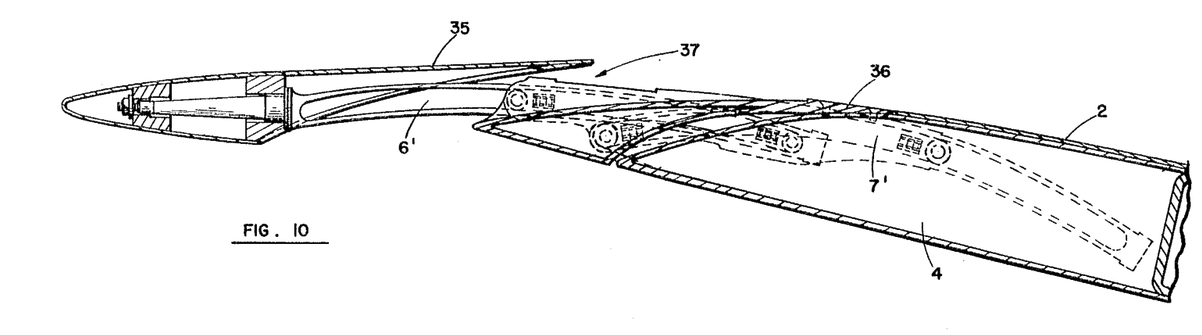
Fig. 10 is a sectional view of the second embodiment similar to Fig. 9 but showing the primary track member and attached first slat segment extended to the first open position with the secondary track member and attached second slat segment in a retracted or closed position.
Figure 11:
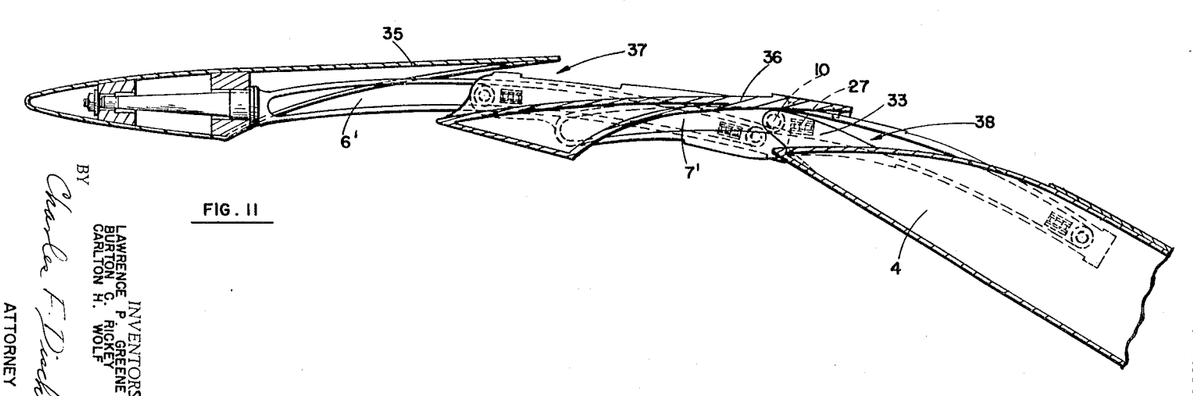
Fig. 11 is another sectional view of the second embodiment showing the secondary track and attached second slat in their extended position with the attached primary track member and first slat in their outermost extended position whereby two slots are formed in the wing.

As best shown in the fully extended position of Fig. 5, slat or auxiliary airfoil 3 is suspended or supported from wing ribs 4 or other suitable internal wing structure by a telescoping track mechanism 5. Track mechanism 5 comprises two arcuate track members, primary track 6 and secondary track 7. Primary track 6 comprises a member having an I-beam cross section with a uniform curvature about its longitudinal axis. This curvature is about a predetermined point 9, in space, below the wing, designated the "high speed axis" or "axis of rotation." Secondary track member 7 as best shown in Figs. 6 and 7 is formed generally of channel sections 12 spaced apart by a top cover plate 29 having a tongue portion 31 and a bottom bifurcated cover plate 32 to form an enclosure for receiving primary track member 6. This secondary track member 7, similarly to track member 6, has a uniform degree of curvature along its longitudinal axis. The axis of rotation of the secondary track member is located in space at a point 8 below the wing that is closer to the wing surface and further rearwardly relative to the wing leading edge than the axis of rotation of the primary track member. This rotational center is designated for convenience in Fig. 12, as the low speed axis.

The arcuate telescoping track mechanism described hereinabove is but one way of implementing the inventive dual-axis slat concept of this invention, and this invention is not to be construed as being limited to the specific track mechanism shown herein. The principle of an arcuate telescoping track construction having different centers of rotation may also be applied to a flap installation at the trailing edge of an aircraft.

For wings wherein it is desired to maintain a constant slot width across the wing span, the primary and secondary tracks will have substantially constant radii of curvature across the wing span; however, in some tapered wing constructions it may be preferred to have a tapered slot. This can be achieved by progressive variation of the track length and/or the radii of rotation of the primary and secondary track members across the span of the wing.

Figure 3:
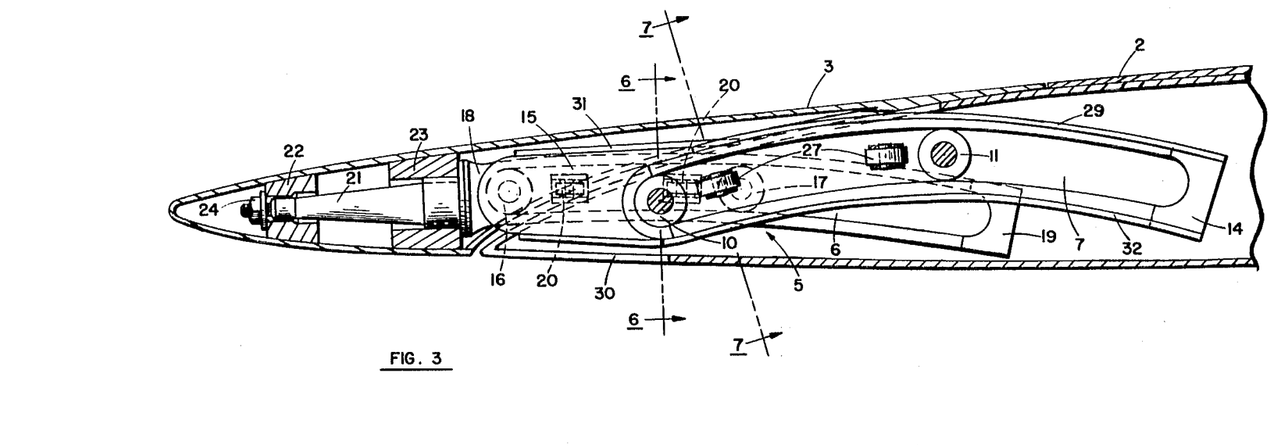
Fig. 3 is a sectional view taken in the plane of line 3—3 in Fig. 2 and shows the slat track mechanism in an elevational view with the track and attached slat fully retracted to form a smooth, continuous airfoil profile suitable for high speed flight.
Figure 4:
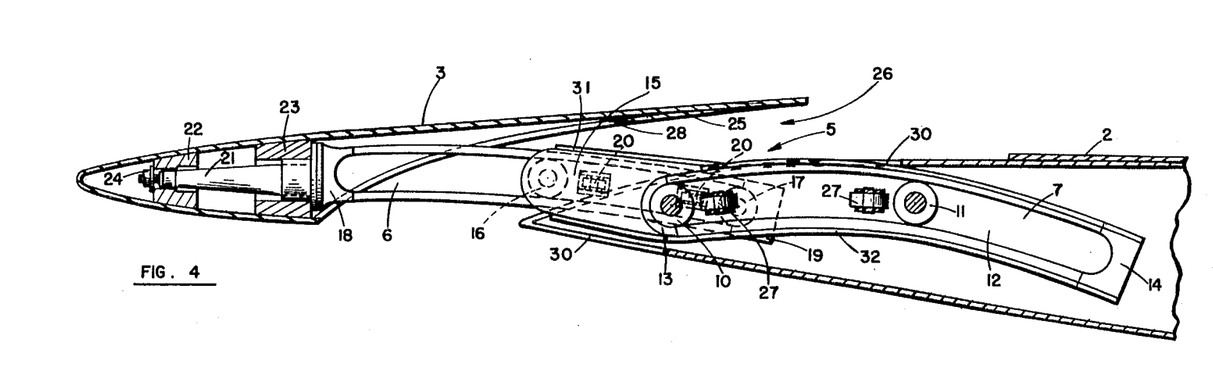
Fig. 4 is a sectional view similar to Fig. 3 but showing the primary track member extended and the slat in its first open or extended position wherein the wing has improved lift and drag characteristics.

The mechanism for supporting and guiding the slats for bodily movements between their extended and extended and retracted positions comprises, for track member 7, a plurality of fore-and-aft rollers 10 and 11 mounted within wing panel 2 on suitable support fittings attached to fixed wing structure, such as the wing ribs 4. Each set of rollers 10 and 11 is situated on the circumference of a circle which has for its axis of rotation the axis 8 located in space below the wing. Track 7 is comprised of integral spaced apart arcuate channel portions 12 which have a curvature that permits the track member, within limits, to be freely movable fore and aft with respect to the wing when positioned on rollers 10 and 11, as shown in Figs. 3–5. When moved on the rollers in this manner member 7 moves in an arc about axis 8. Stops 13 and 14 are rigidly secured to the fore-and-aft ends, respectively, of channel portions 12 to limit the fore-and-aft movement of member 7.

Track 7 includes further forwardly extending portion 15 which carry oppositely disposed rollers 16 mounted interiorly thereof for supporting the forward end of telescoping primary track 6. Rollers 17 are similarly mounted opposite each other on the interior of track 7. Rollers 16 and 17, in a manner similar to rollers 10 and 11, are predeterminately positioned to lie on the circumference of a circle having as its axis of rotation the axis 9 in space. Arcuate track member 6 has a corresponding degree of longitudinal curvature so that with rollers 16 and 17 positioned between the top and bottom flanges of the primary track, the track member will move about axis 8. Stops 18 and 19 at the fore-and-aft ends of track member 6 limit the fore-and-aft movement of member 6.

A series of side rollers 20 are located in close proximity to each of the principal rollers which allow fore-and-aft movement of the track members. These side rollers constrain the track members against lateral movement while allowing uninterrupted extension or retraction of the track members.

The forward end of primary track 6 as shown terminates in a tapered spindle 21 which projects into the forward portion of the slat through bores in spar members 22 and 23 and is firmly attached to the slat by spindle nut 24. This pivotal arrangement permits angular adjustment of the slat without introducing torsional moments into the track mechanism which might result in unequal loading of the rollers and binding of the track members.

For high speed aircraft the slat would preferably be of a heat-resistant high-strength-to-mass type of construction such as is attained by the use of high temperature honeycomb material. Primary track 6 is fitted into the slat through a closely fitting cutout portion 28 in the rear surface skin 25 of the slat. Similarly the skin of the wing panel 2 has a cutout 30 therein closely conforming to the cross section of the primary and secondary track members thereby allowing extension and retraction of the track members with a minimum of aerodynamic penalty.

The method of operation of the automatic, sequentially positioned slat is relatively simple and depends only upon a proper choice of design parameters in accordance with a particular desired mode of operation. The illustration used in this application discloses a thin uncambered wing. Any wing, cambered or uncambered, must be operated at some positive angle of attack to produce an upwardly directed aerodynamic force component acting on the wing in order to produce lift. In order to increase the lift on the wing an increase in the angle of attack is required. At the lower angles of attack the resultant of the aerodynamic force on the slat acts near the forward edge of the wing and is directed upwardly and may also be directed rearwardly. As the angle of attack of the aircraft increases, and/or the speed of the aircraft decreases (with a resultant increase in the angle of attack) this force resultant tends to swing about until it is directed upwardly and forwardly. By proper determination of a point in space below the wing, an axis of rotation for movement of an arcuate track may be found such that when the aerodynamic force resultant moves aft of this axis, a forwardly directed component of the force extends the slat outwardly to the limit of movement of that particular track member. Conversely when the force resultant moves forward of the axis the slat closes. By the use of a series of sequentially operating tracks, each having a different curvature and each having a different axis of rotation, the slat may be successively displaced to different forwardly extended positions. Each position here being selected in accordance with a predetermined speed and angle of attack that will necessarily cause the aerodynamic force resultant for the particular flight conditions to move rearwardly of the selected axis of rotation of the arcuate track segment for an increase in the angle of attack. The force component acting on the slat will then cause the slat and attached arcuate track member to rotate to the forward limit of movement of the particular track segment being actuated.

Figure 12:
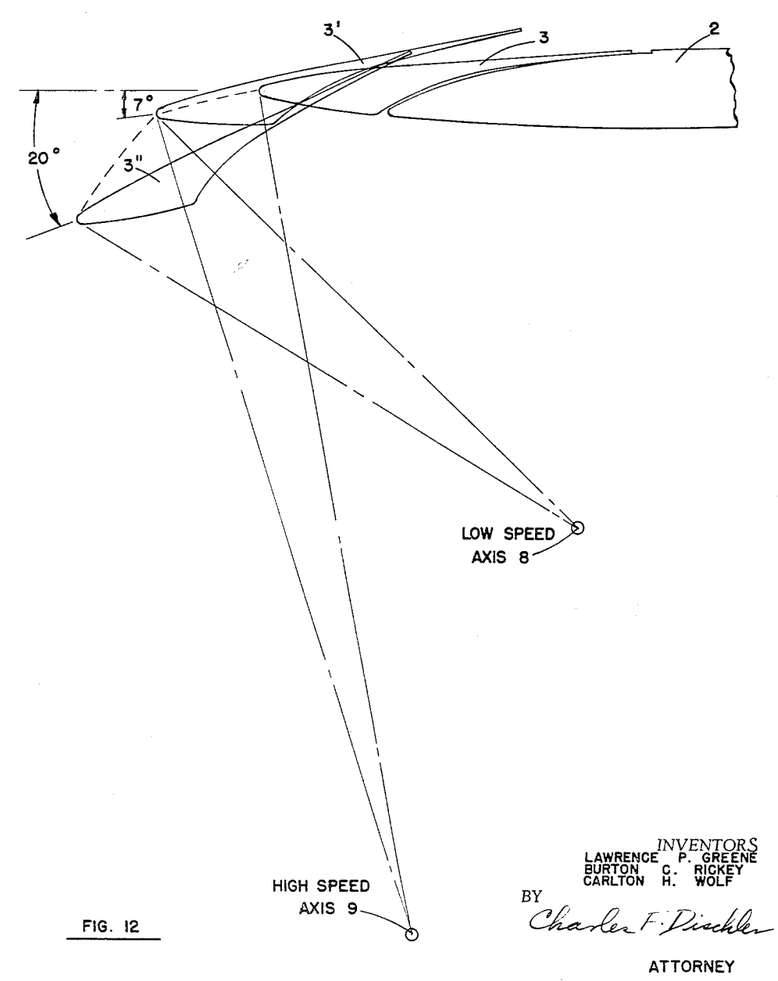
Fig. 12 is a diagram of a wing panel and slat showing the relative locations of the high and low speed axes of rotation of the slat and a typical angular and translational displacement of the slat relative to the wing panel about the axes of rotation.

Thus, as shown in Fig. 12, the high speed axis of rotation 9 for telescoping primary track 6 is located forwardly of the low speed axis 8 for secondary track 7. Axis 9 was selected for optimum high speed cruise and maneuvering characteristics wherein only primary slat track 6 is extended and the slat 3 is in its first open position. Axis 8 has been chosen for the lower operating speeds associated with landing, takeoff, approach or loiter operations wherein secondary slat track 7 extends to move track 6 and the attached slat 3 to a second more forwardly extended position. As further shown in Fig. 12, in its first extended position 3' the slat has assumed a droop angle of approximately 7° with respect to the wing chord line and thus provided the wing with a slot therethrough that was lacking prior to slat extension. This slot serves as a passageway for conducting high energy air from below the wing to the upper surface of the wing. This high energy air serves to energize the boundary layer air on the wing upper surface with a consequent increase in lift. Upon further extension to the second slat position 3'' the angle is increased to approximately 20° with a further increase in the wing lift. It will be understood that this invention is not limited to the droop angles as described and illustrated herein. Any desired degree of slat angularity may be achieved dependent on the length and degree of curvature of the track segments and in accordance with the optimum flight characteristics desired.

Thus whenever the air load resultant is forwardly of axis 9 the slat will be fully retracted and the wing will be in its maximum speed configuration. Whenever the air load resultant lies between axis 9 and axis 8 the slat will be extended to its first intermediate open position for high speed cruise or maneuvering of the aircraft. Similarly when the force resultant lies rearwardly of axis 8 the slat (or slats) will be fully extended to the low speed position for landing or takeoff.

Retraction of the slat and attached tracks is entirely automatic and is simply the reverse of the extension procedure. For example, as the speed increases after takeoff and the angle of attack decreases the air load force resultant moves forwardly until it is ahead of the low speed axis of rotation 8. The aerodynamic loading components on the slat cause the secondary track to move to its extreme rearward position, thus causing the attached primary track and slat to retract to its first extended position. Upon attaining the necessary high speed that will cause the force resultant to move ahead of the high speed axis 9, the slat and primary slat track 6 will move rearwardly to place the slat in juxtaposition to the wing panel and close the slot 26. Since the slat is responsive to aerodynamic loading no slat latch or locking device is ordinarily required to hold the slat in a closed position although in some instances a detent means may be desirable.

Action of the slat under changing aerodynamic loading conditions is positive, immediate, and forceful. When the force resultant moves past the axis of rotation of either track in either direction the slat responds quickly and smoothly to either extend or retract in conformance to the location and direction of the component of force acting on the slat.

Mechanically, as the slat moves forward from its closed position, the primary track rolls within the secondary track until primary track rearward stop 19 makes contact with the primary track rearward roller 17 which is mounted on secondary track 7. With continued rearward movement of the loading force resultant past axis of rotation 8, secondary track 7 now moves forward between the supporting wing ribs 4 until stop 14 on the rearward end of the secondary track makes contact with secondary track rear rollers 11. The forward motion of the slat is now complete. Upon retraction, secondary track forward stop 13 first moves into contact with secondary forward rollers 10, followed by primary track forward stop 18 contacting the primary track forward rollers 16. If the secondary track starts to move while the primary track is moving, the action of the telescoping track mechanism is not impaired.

Thus, in addition to the vastly improved airfoil characteristics resulting from this multiple-position slat mechanism a saving in space is effected within the wing due to the arcuate telescoping tracks. This allows installation in wings without the piercing of wing spars or violation of the integrity of fuel cells, such as of the "wet-wing" type. Additionally, the particular type of track disclosed herein operates at lower stresses since the track has not been split or slotted to accommodate the rollers but rather depends on top and bottom flanges to provide tracks which allow a snug fit on the rollers. This permits the use of fewer slats per wing since their load carrying capacity is greater than that of the tracks in the prior art.

It is obvious that the concept of this invention and the manner of carrying it into operation are not limited solely to two slat positions. Where conditions require, more than two slat positions may be utilized, the principle and mechanism for slat operation disclosed herein being readily adaptable thereto. Furthermore, while the sectional drawings herein show a track installation for chordwise extension of the slat, the track mechanism may also be utilized in sweptback wings wherein it is desired to extend the slats in a direction parallel to the longitudinal center line of the aircraft.

A second embodiment of the invention is shown in Figs. 8–11. As shown therein, dual slats are utilized in conjunction with the dual-axis telescoping track mechanism described above. The leading edge is formed by a slat section 35 rigidly attached to primary track member 6'. Intermediate of wing panel 2' and slat 35, a second slat section 36 is rigidly attached to secondary track 7' and is movable therewith. The surfaces of slat 36 that adjoin the wing panel and slat 35 are contoured to closely abut these adjoining surfaces to insure a smooth, uninterrupted airfoil contour when the two slats are in a retracted position. An extension 33, integral with wing ribs or track supports 4' projects beyond the forward edge of the wing panel surface for supporting the forward main roller 10' and side rollers 27' for track 7'.

In high speed cruise operations, for instance, slat section 35 and primary track 6' may be displaced angularly forwardly to form a first slot 37 by the aerodynamic forces acting thereon when the resultant air load moves aft of the hinge axis 9' in the manner set forth above. Slat section 36 is not influenced under these conditions and remains in the closed position. For landing and take-off low speed operation, as the resultant air loads move further aft of the axis of rotation 8' of track member 7', slat section 36 and track member 7' will be displaced forwardly and angularly downwardly and will carry track member 6' and slat section 35 to a further forward position. This forms a second slot 38 between slat section 36 and wing panel 2 while first slot 37 is merely displaced forwardly and downwardly without any change in the dimensions thereof.

This dual slat arrangement has the advantage of improving the contouring of the airfoil and providing slots that can be designed to proportion the air flow over the airfoils to better advantage and it also provides shorter, more efficient throat sections between the slat sections. Additionally, by using double slats on telescoping dual axes tracks, the first slat can be of shorter chord length, thus resulting in lower design loads at high speed. Furthermore, the second slat serves to stabilize the secondary or floating track member; while overlapping of the slat sections requires that less percent of the airfoil chord be allocated to space for mechanism for any specific slat extension.

Figure 13:
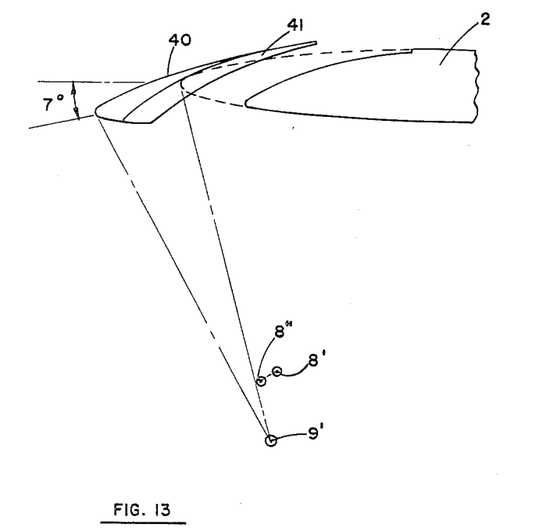
Fig. 13 is a diagram of a further modification of the two-position dual slat embodiment wherein the relative degrees of curvature of the respective track members are reversed to provide initial unitary rotational movement of both slats about the high speed axis.
Figure 14:
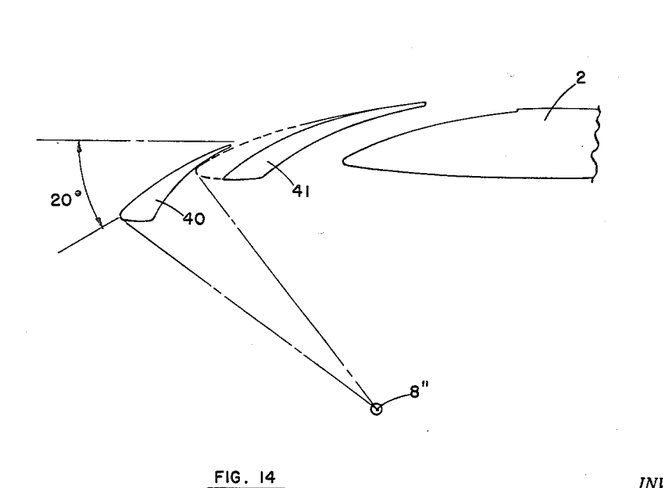
Fig. 14 is a diagram of this further modification showing the forward slat rotated to its open position about the low-speed axis of rotation.

Another embodiment of a dual slat arrangement is illustrated in Figs. 13 and 14. Here the tracks have been reversed in relation to the slats so that the forwardmost slat 40 moves about the low speed axis 8' on the track having the greatest degree of curvature, while the second or inner slat 41 moves about the high speed axis 9' on the track having the least curvature. When the force resultant on the slat moves rearwardly of high speed axis 9', upon a decrease in speed, inner slat 41 moves forwardly carrying front slat 40 along with it to the position shown in Fig. 13. This causes the axis of rotation 8' of the front slat to be translated to a new and more forward position 8". Further movement of the aerodynamic force resultant to a point rearwardly of the translated low speed axis 8" then will result in moving leading edge slat 40 to its furthest forward position, thereby forming two slots through the wing. In this modification the use of telescoping tracks is not required. Independent tracks may be used and it is not necessary that their longitudinal center lines be in a common vertical plane.

The multiple-position, multiple-axis slat mechanism of our invention in any of the disclosed embodiments greatly enhances the operating capabilities of thin high speed wings, as well as making possible large savings in weight, reduction in complexity, lower power requirements, and the like, for wings of this type.

While particular embodiments of this invention have been disclosed herein, it will be apparent that various changes and modifications may be made in the construction and arrangements of the various parts without departing from the spirit and scope of this invention in its broader aspects or as defined in the following claims.

We claim:

1. In an aircraft having a wing, an aerodynamically actuable slat means forming the leading edge portion of said wing and progressively extendible forwardly therefrom in sequential progressions, guide means for automatically positioning said slat means in each of several predetermined forwardly extending positions in accordance with the location of the resultant of the aerodynamic loading force, said guide means having different axes of rotation located beneath the wing for producing different forward curvilinear motions of the slat means under the action of the applied aerodynamic loading.

2. In an aircraft having a wing, an aerodynamically actuable slat means forming the leading edge portion of said wing and progressively extendible forwardly therefrom in sequential progressions, guide means for automatically positioning said slat means in each of several predetermined forwardly extending positions in response to changes in the location of the resultant of the aerodynamic loading force, said slat positioning means having different axes of rotation located beneath the wing for producing different forward curvilinear motions of the slat means under the action of the applied aerodynamic loading, said slat means first rotating about one axis of rotation to a first one of said forwardly extending positions and then rotating about the second axis of rotation to the second one of said forwardly extending positions.

3. A variable high-lift device for the leading edge of an aircraft wing comprising an aerodynamically actuable slat means forming the leading edge portion of said wing and extendible forwardly and downwardly therefrom in several progressive steps, means for automatically positioning said slat means in one of several predetermined forwardly extending positions, the position of said slat means being determined by the location of the resultant of the slat aerodynamic force, said slat positioning means having different axes of rotation located beneath the wing for producing a forward curvilinear motion of the slat means under the action of the aerodynamic lifting force, at least a part of said slat means first rotating about one axis of rotation to a first forwardly extending position when the upwardly directed resultant of the aerodynamic force is rearwardly of the first axis of rotation, said slat means then rotating about the second axis of rotation to the second forwardly extending position when the upwardly directed resultant of the aerodynamic force is rearwardly of the second axis of rotation.

4. In an aircraft having a wing, an aerodynamically actuable leading edge slat adapted to be progressively extendible forwardly and downwardly from said wing in progressive increments, guide means for automatically positioning said slat in more than one extended position, said guide means having dual axes of rotation non-coincidently located beneath the wing for producing several successive different curvilinear motions of the slat, said slat first rotating about a first one of said axes to a first forwardly extending position and forming a slot of fixed width between said slat and the wing when the aerodynamic force resultant falls within a predetermined area of the wing, and said slat then rotating about a second one of said axes to a second more forwardly position whereby the slot width is increased when the force resultant moves further rearwardly.

5. A variable high-lift device for the leading edge of a thin wing for a high speed aircraft comprising an aerodynamically actuable slat forming the leading edge portion of said wing, slat track means movably mounted on said wing and attached to said slat, each of said track means including a first member rotatable about a first axis of rotation located beneath the wing and a second member movable relative to said first member and rotatable about a second axis of rotation located beneath the wing, said first axis of rotation being forwardly of said second axis of rotation whereby as the resultant of the aerodynamic lifting forces moves rearwardly of said first axis of rotation the first member will be rotated about its axis of rotation by the aerodynamic forces to move the attached flap forwardly in a curvilinear motion and when the resultant of the aerodynamic lifting forces moves rearwardly of the second axis of rotation the second member will be rotated about its axis of rotation to move the attached slat forwardly to a second more extended position for achieving optimum lift characteristics for said wing.

6. A variable high-lift device for the leading edge of a thin wing for a high speed aircraft comprising an aerodynamically actuable slat forming the leading edge portion of said wing, forwardly extending slat tracks in said wing comprising first and second members movable relative to each other, roller means in said wing for slidably supporting said second member, said first member being attached at its forward end to said slat, said first and second members being arcuate and having different axes of rotation located beneath the wing with the axis of rotation of said first member being forwardly of the axis of rotation of said second member whereby the first track member and the attached slat will extend forwardly in a curvilinear path about said first axis of rotation when the air load force resultant moves rearwardly of said first axis of rotation and whereby the second member will extend forwardly when the air load force resultant moves rearwardly of said second axis of rotation to thereby further extend the slat.

7. A variable high-lift device for the leading edge of a thin wing for a high speed aircraft comprising an aerodynamically actuable slat forming the leading edge portion of said wing, substantially forwardly extending arcuate slat tracks comprising a first member attached at one end to said slat and telescopically mounted within a second member for limited curvilinear movement forwardly and downwardly therefrom, means in said wing slidably positioning said second member for forwardly extendible curvilinear movement out of said wing, said first member rotating about a first axis and said second member rotating about a second axis that is located rearwardly of said first axis whereby said first member and attached slat will be extended forwardly and downwardly along an arcuate path about said first axis to a first position when the aerodynamic lifting force resultant moves rearwardly of said first axis and whereby the second member will extend forwardly and downwardly along an arcuate path with the first member and attached slat when the aerodynamic lifting force resultant moves rearwardly of said second axis thereby moving the slat angularly further forward to achieve an optimum lift characteristic for said wing.

8. A variable high-lift device for the leading edge of a thin wing of a high speed aircraft comprising an aerodynamically actuable slat means, means for guiding said slat means from one position relative to said wing to any one of a series of other positions through a series of distinct successive arcuate movements each of which has a different axis of rotation, said axes of rotation being located beneath the wing and being predeterminately selected to provide automatic step actuation of the slat means in accordance with predetermined locations of the resultant of the aerodynamic loading forces on the wing, each slat position corresponding to optimum lift and drag characteristics for a particular position of the aerodynamic force resultant on the wing.

9. In an aircraft having a wing, an extendible aerodynamically actuable multiple slat means comprising a first and second slat forming the leading edge and next forwardmost portion of said wing, means for guiding said first slat to an extended position forwardly of the wing in accordance with a predetermined position of the aerodynamic force resultant on the slat and forming a first slot between said first and second slats with said second slat remaining in a closed position, and means for guiding said extended first slat and said closed second slat to a more forwardly extended second position to form a second slot between the second slat and the wing while maintaining the first slot dimensions constant, said slat means moving to said second position when the aerodynamic resultant force on the slat acts at a second predetermined location.

10. In an aircraft having a wing, a first aerodynamically actuable slat, a second aerodynamically actuable slat, means for guiding the extension of the first slat to a first angularly extending position relative to said second slat, and a means for guiding the first and second slats to a second more forwardly extended position while maintaining a fixed relationship therebetween, said slat positions being determined in accordance with predetermined locations of the wing loading force resultant.

11. In an aircraft having a wing, a first aerodynamically actuable slat, a second aerodynamically actuable slat, a telescoping track means movably connecting said slats to said wing, said telescoping track means comprising a first member attached to said first slat and a second member attached to said second slat, said first member being curvilinearly slidable relative to said second arcuate member about a first axis of rotation located beneath the wing, said second member being movable relative to said wing about a second axis of rotation located beneath the wing and rearwardly of said first axis of rotation, said first member and attached first slat moving outwardly when the resultant of the aerodynamic forces acting on the wing lies rearwardly of said first axis of rotation, and said second member moving outwardly to position the first and second slats in a second further advanced position when the resultant of the aerodynamic forces is rearwardly of said second axis of rotation.

12. A telescoping track mechanism for an auxiliary airfoil adapted for mounting on wing structure of an aircraft comprising an inner arcuate track member having a relatively short radius of curvature about a center point in space below the wing, an outer arcuate track member having a relatively longer radius of curvature about a different center point in space, and roller means within the airfoil operatively engaging and independently guiding said inner and outer tracks during their separate and independent movements about said center points.

13. A telescoping track mechanism for slidable mounting on a supporting body comprising relatively movable first and second arcuate members having different degrees of curvature, a first roller means mounted in said second arcuate member operatively contacting said first arcuate member for restraining and guiding the circular fore-and-aft movement of said first member relative to said second member while preventing lateral movement of the first member, said first roller means being positioned to provide circular movement of the first arcuate member about the center corresponding to the first arcuate member center of curvature, and a second roller means mounted on said supporting body operatively contacting the second arcuate member for restraining and guiding said second arcuate member in a circular fore-and-aft movement while restraining the second member against lateral movement relative to the supporting structure, said second roller means being positioned to provide circular movement of the second arcuate member about the center corresponding to the second arcuate member center of curvature.

References Cited in the file of this patent

UNITED STATES PATENTS

| | | |
|---|---|---|
| 1,862,902 | McDonnell | June 14, 1932 |

FOREIGN PATENTS

| | | |
|---|---|---|
| 404,149 | Great Britain | Jan. 11, 1934 |
| 1,127,421 | France | Aug. 13, 1956 |